L. BRENNAN.
MEANS FOR IMPARTING TO AND MAINTAINING THE STABILITY OF BODIES SUCH AS SINGLE TRACK VEHICLES OR VESSELS.
APPLICATION FILED JUNE 9, 1910.

1,019,942.

Patented Mar. 12, 1912.

5 SHEETS—SHEET 1.

L. BRENNAN.
MEANS FOR IMPARTING TO AND MAINTAINING THE STABILITY OF BODIES SUCH AS SINGLE TRACK VEHICLES OR VESSELS.
APPLICATION FILED JUNE 9, 1910.

1,019,942.

Patented Mar. 12, 1912.
5 SHEETS—SHEET 4.

Attest:
Ewd L. Tolson
Edward N. Sarton

Inventor,
Louis Brennan,
by Chas. Middleton Donaldson & Rian
Attys.

L. BRENNAN.
MEANS FOR IMPARTING TO AND MAINTAINING THE STABILITY OF BODIES SUCH AS SINGLE TRACK VEHICLES OR VESSELS.
APPLICATION FILED JUNE 9, 1910.

1,019,942.

Patented Mar. 12, 1912.
5 SHEETS—SHEET 5.

Attest:
Ewd L. Tolson
Edward N. Sarten

Inventor:
Louis Brennan,
by Spear Middleton Donaldson & Spear
Attys.

UNITED STATES PATENT OFFICE.

LOUIS BRENNAN, OF GILLINGHAM, ENGLAND.

MEANS FOR IMPARTING TO AND MAINTAINING THE STABILITY OF BODIES SUCH AS SINGLE-TRACK VEHICLES OR VESSELS.

1,019,942.     Specification of Letters Patent.     Patented Mar. 12, 1912.

Application filed June 9, 1910. Serial No. 566,031.

*To all whom it may concern:*

Be it known that I, LOUIS BRENNAN, C. B., a subject of the King of Great Britain and Ireland, residing at "Woodlands," Gillingham, in the county of Kent, England, civil and mechanical engineer, have invented certain new and useful Improvements Relating to Means for Imparting to and Maintaining the Stability of Bodies Such as Single-Track Vehicles or Vessels, of which the following is a specification.

The invention consists in controlling lateral supports for a single track vehicle in such a manner that they can only be lowered into position for supporting the vehicle when the vehicle is at rest.

The invention consists further in lateral supports or legs sliding in guides and so arranged that they are actuated by means coöperating with the means which actuate the brakes.

The invention further consists in controlling the lateral supports by cylinders and plungers actuated by fluid pressure and arranged to be operated either in connection with or separately from the brake cylinders.

The invention also consists in the improved lateral supports for single track vehicles hereinafter described.

Figure 1:
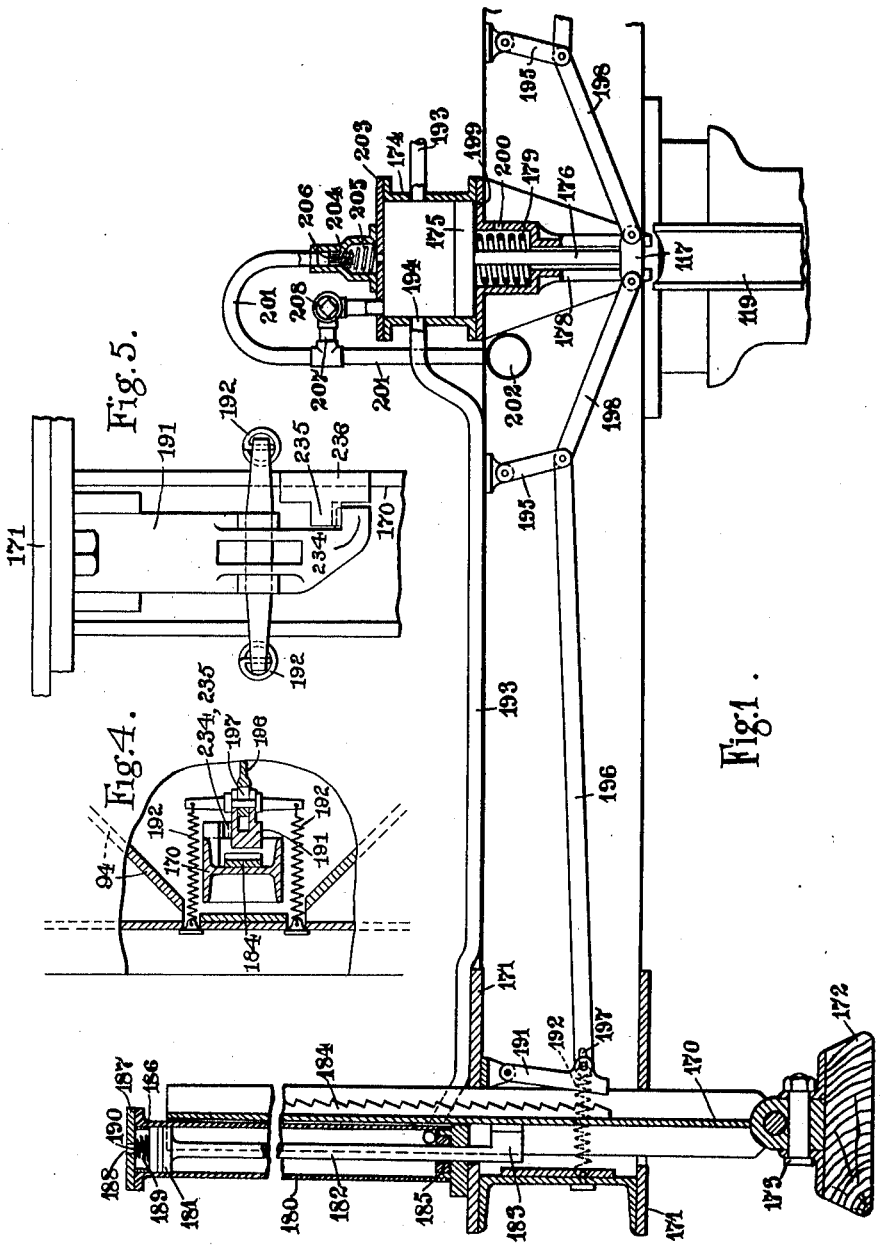
Figure 2:
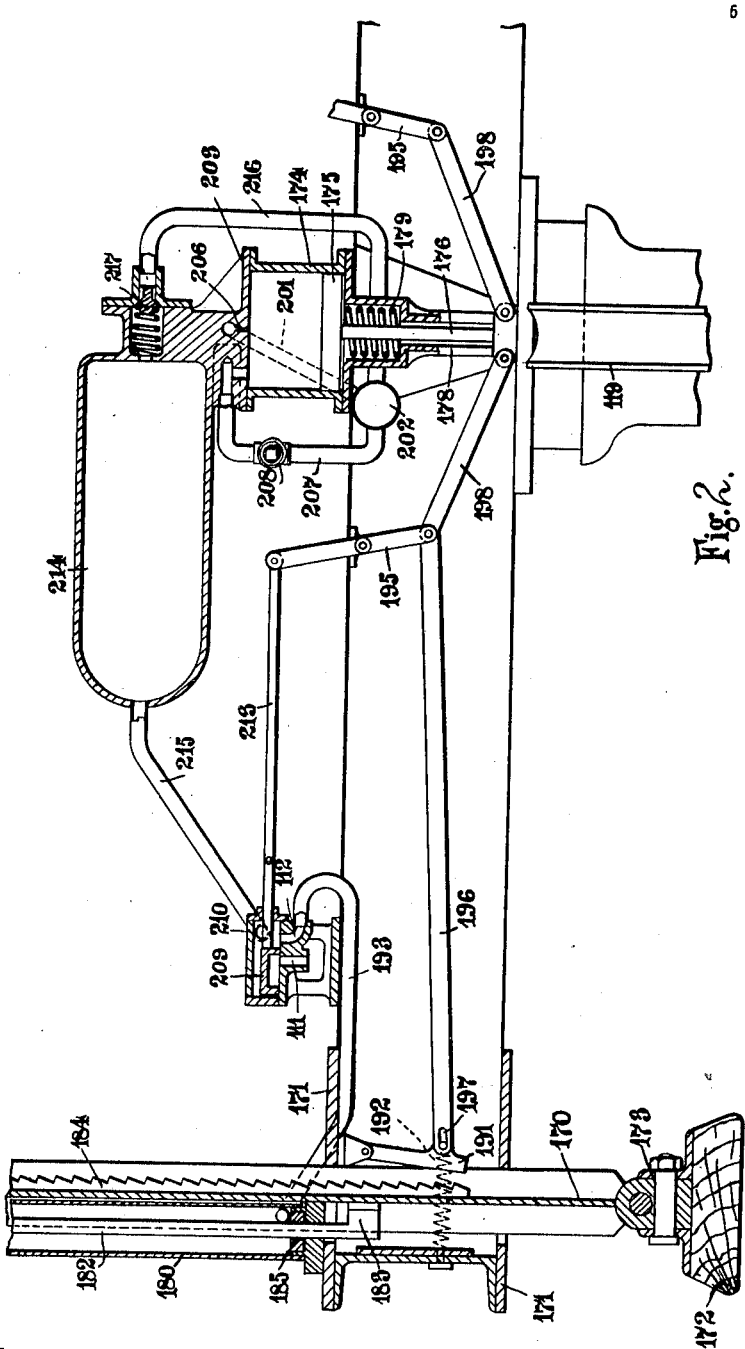
Figure 3:
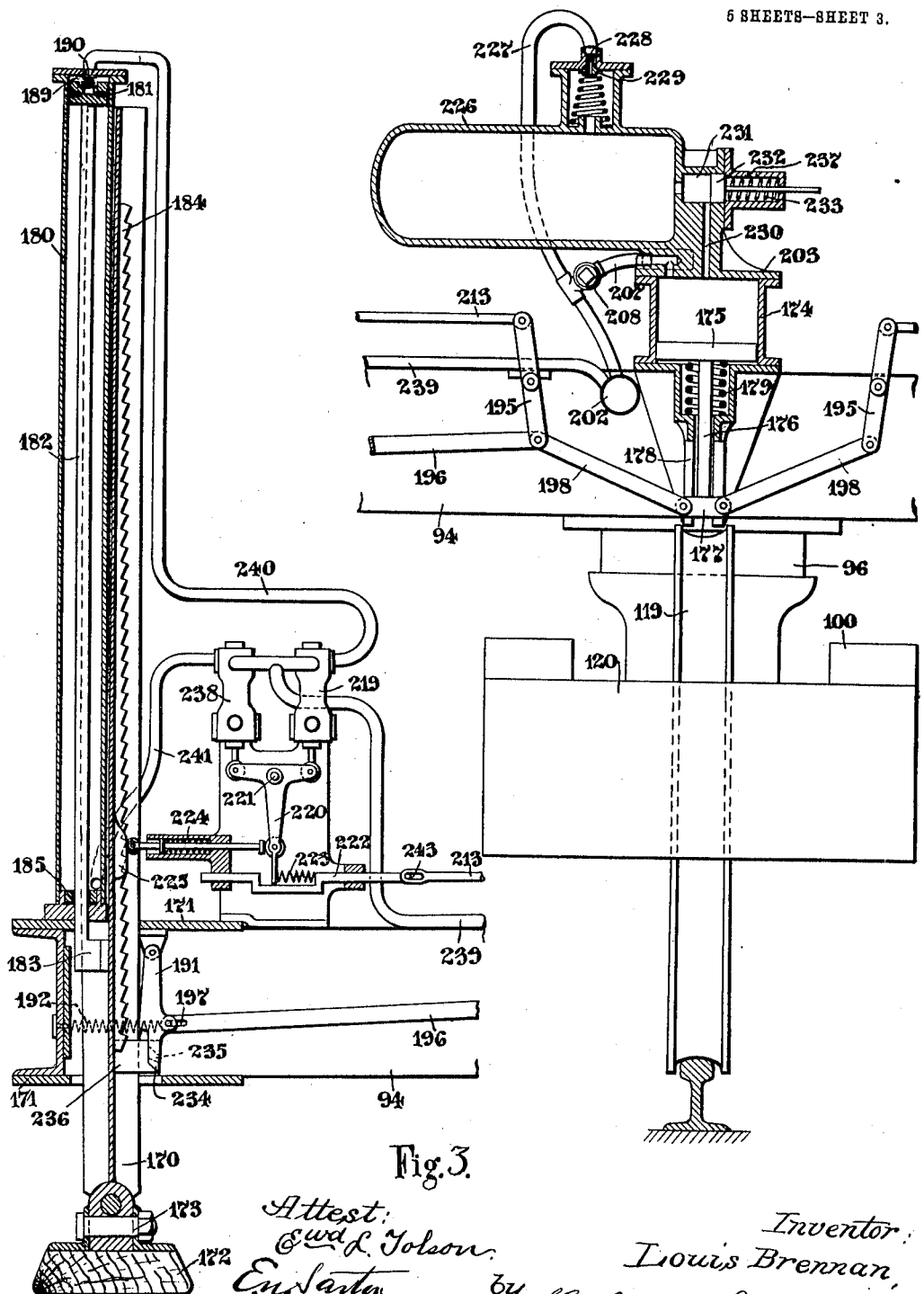
Figure 6:
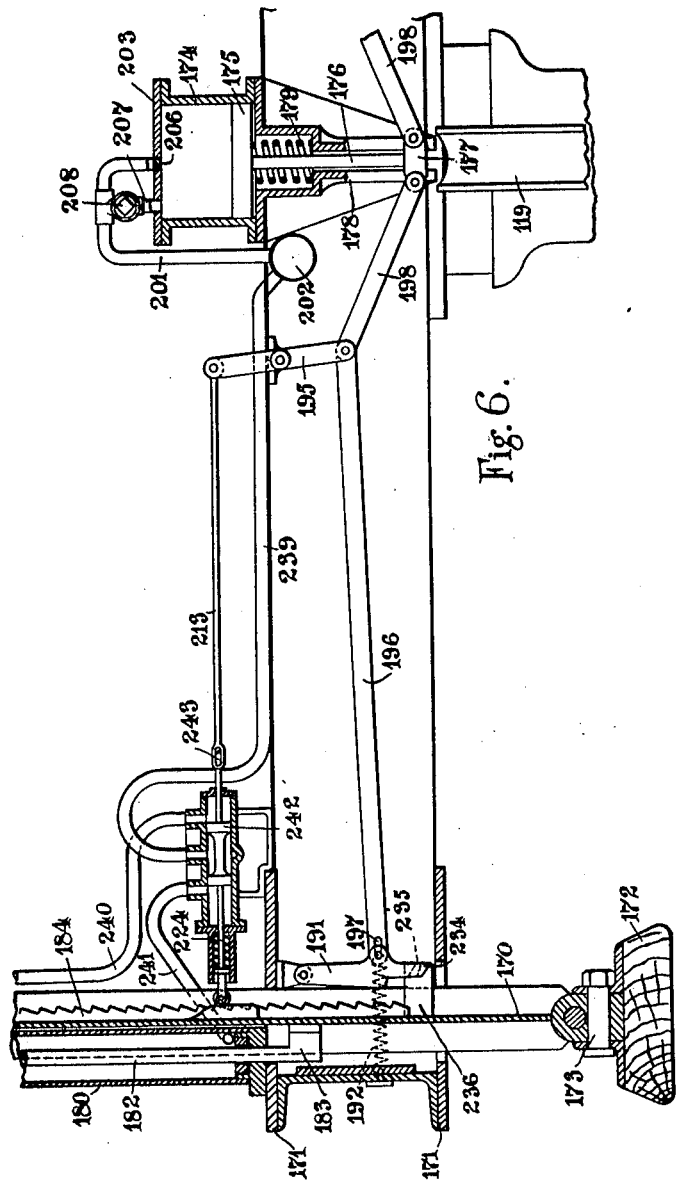
Figure 7:
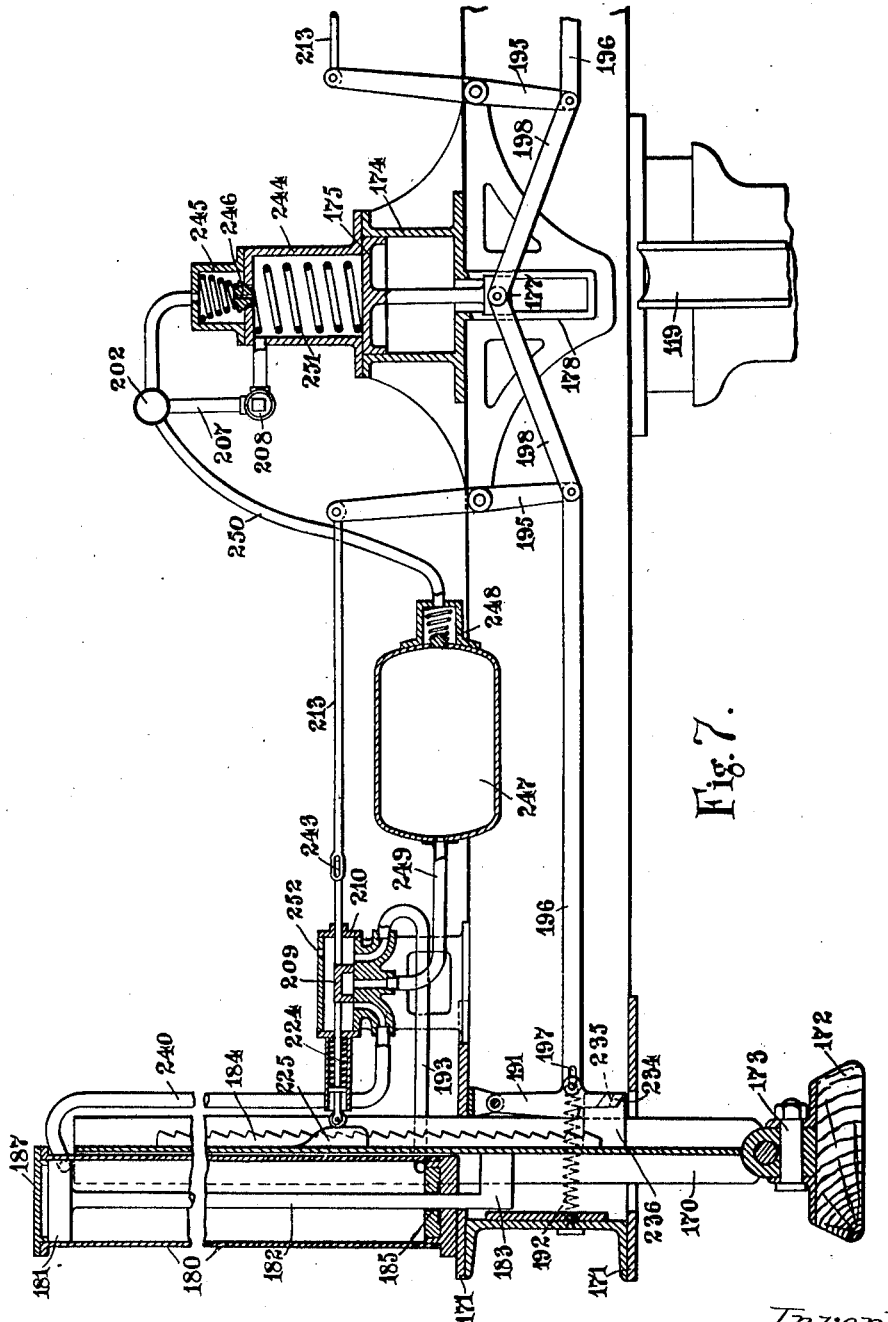

Referring now to the accompanying illustrative drawings, Figure 1 shows one of a pair of lateral supports for a single track vehicle and illustrates the construction in which gravity is employed to lower the support, fluid pressure being used to raise the support. Fig. 2 shows a modification in which a separate valve is employed to control the support lifting fluid. Fig. 3 is a view broken into two parts of a construction in which fluid pressure is employed to lower as well as raise the supports. Figs. 4 and 5 illustrate details of the detent and holding-up catch. Fig. 6 illustrates a modification of Fig. 7 in which a piston valve is employed to control the fluid and in which the delay action vessel is omitted. Fig. 7 illustrates a modification in which a vacuum is employed to operate the support.

In carrying this invention into effect according to one modification as illustrated in Fig. 1 and as applied to a pressure brake system, such for instance, as the Westinghouse air brake, the lateral supports 170 are arranged to slide vertically in guides 171. At the lower ends feet 172 are provided which may be constructed of wood mounted on universal joints 173, the lateral supports being provided at each side of the vehicle. Attached to the frame of the vehicle is a cylinder 174 in which slides a piston 175 the piston rod 176 of which carries a cross head 177 sliding in a guide 178. The downward motion of the piston 175 is opposed by the spring 179. Situated in proximity to the support 170 is a cylinder 180. In this cylinder slides a piston 181 connected by a piston rod 182 and bracket 183 to the lateral support 170. Upon the lateral support there is provided a suitable rack 184 and a leakage preventing device such as a hydraulic packing 185 is provided at the lower end of the cylinder. At the upper end of the cylinder an annular seating ring 186 is provided against which the piston makes a sealed joint when at the upper end of its stroke. The piston 181 is preferably provided with cup leathers, although other suitable packing may be employed. In the cylinder cover 187 is provided an orifice 188. Upon the piston 181 is provided a spring 189 carrying a disk 190. A pawl or detent 191 suitably hinged to the frame of the vehicle is arranged so that it may engage the rack 184 when desired. Springs 192 act to press the detent 191 against the rack 184. A pipe 193 connects the cylinder 180 with the cylinder 174. The pipe 193 opens into a port 194 in the cylinder 174 at a point in the side wall of the cylinder. The detent 191 is connected with a swing lever 195 by a link 196 having a slot 197 engaging a pin upon the detent. A link 198 connects the end of the swinging lever 195 with the cross head 117. A packing ring 199 is provided in the cylinder 174 for a similar purpose to the ring 186. A port 200 is provided in the lower extremity of the cylinder 174. A pipe 201 connects the cylinder 174 to the train pipe 202. It will be understood that the train pipe 202 may be the same pipe from which the brakes are operated. Immediately above the cylinder cover 203 there is provided a puppet valve 204 loaded by a spring 205 and having a bleed hole 206. It will be understood that the support actuating cylinder, rack, detent, and toggle levers are duplicated upon the opposite side of the vehicle.

The action of the device according to the modification illustrated in Fig. 1 is as follows:—With the parts in the positions illustrated and a normal holding-off pressure existing in the train pipe 202 suppose a fall in pressure to occur in the pipe 202 such as would occur upon the application of the brakes, then the pressure in cylinder 174 will commence to fall, but as the fluid can only escape by the bleed hole 206 the fall in pressure in cylinder 174 is slow. The size of the bleed hole is so chosen that sufficient delay in pressure fall occurs to enable the brakes to bring the vehicle to rest. Upon the pressure falling in 174 sufficiently for the spring 179 to act the piston 175 is thrust upward. The effect of this is to bring the link 198 approximately in line with the link 196, thus swinging the lever 195 toward the detent 191 and permitting the spring 192 to press the detent 191 against the rack 184. When the piston 175 passes the port 194 communication is established between the pipe 193 and the exhaust port 200. Pressure instantly falls in the pipe 193 and cylinder 180, thus allowing the support 170 and piston 181 connected to it to fall quickly. When the support 170 is arrested in its descent by reaching the ground the detent 191 by engaging the rack 184 prevents upward movement of the support relatively to the car, thus affording lateral support to the vehicle. When normal holding-off pressure is restored in the train pipe 202 the valve 206 rises off its seat and allows the cylinder 174, pipe 193, cylinder 180 to be quickly filled with fluid pressure. The effect of this is to press the piston 175 down, and owing to the toggle action of the levers 198 and 196 the detent 191 is pulled out of engagement with the rack 184. The arrangement of the ports is such that the piston 175 uncovers the port 194 just before the detent is disengaged from the rack. As soon as this occurs the piston 181 rises carrying with it the support 170. In rising the piston 181 is in free communication with the atmosphere by way of the hole 188. Upon nearing the upper end of its stroke, however, the spring carried disk 190 closes the hole 188, entrapping a quantity of fluid, thus cushioning the end of the stroke. The maintenance of holding-off pressure in the pipe 202 seals the piston 175 upon the ring 199 and the piston 181 upon the ring 186, thus keeping the support 170 in its fully raised position. In order to be able to adjust the rate of leakage of pressure from the cylinder 174 a by-pass 207 controlled by a valve 208 is provided to supplement when desired the bleed hole 206.

In carrying the invention into effect according to a further modification and as illustrated in Fig. 2 instead of employing the piston 175 to control the admission and exhaust of fluid to the pipe 193 a separate valve 209 working in a valve chamber 210 and controlling ports 111 and 112 is provided. The valve 209 is operated by a pivoted rod 213 operated by an extension of the lever 195. In order to obtain the necessary promptitude in operation of the legs a storage chamber of some considerable capacity 214 is provided connected by a pipe 215 to the valve chamber 210 and by a pipe 216 to the train pipe 202. The communication between the pipe 216 and the chamber 214 is controlled by a spring loaded valve 217. The action of this modification is as follows:—When the pressure in the train pipe 202 drops below the normal holding-off pressure the pressure in the cylinder 174 slowly falls by leakage through the bleed hole 206 which as before may be supplemented if required by the by-pass 207. When the pressure in the cylinder 174 falls below a certain value the spring 179 forces the piston 175 upward straightening the links 196, 198 and allowing the spring 192 to pull the detent 191 against the rack 184, but the straightening of the links 196, 198 swings the lever 195 so that the valve 213 is moved to place the ports 111 and 112 in communication. The effect of this is to allow the escape of fluid in the cylinder 180 by way of the pipe 193 and exhaust port 111. This causes the support 170 to fall, which is retained in its operative position by the detent 191. When it is desired to raise the legs pressure in the train pipe 202 is raised. This forces the piston 175 down disengaging the detent 191 and placing the valve in such a position as to cover the exhaust port 111 and establish communication between the cylinder 180 and chamber 214 by way of the pipe 193, port 112 and pipe 215, thus raising the support 170.

In carrying the invention into effect according to a further modification such as shown in Fig. 3 the support 170 is caused to descend by fluid pressure acting on the upper side of the piston 181 as well as by the effect of gravity. In this modification the fluid operating the support 170 may conveniently be controlled by valves of the type described in my British Patent No. 7177 of 1902. These valves 219 and 238 are operated by a three-armed lever 220 pivoted at 221. The lower arm of the lever 220 is operated by a bolt 222 moved by a link 213 on the upper end of the swinging lever 195. In one direction the arm of the lever 220 is operated positively, and in the other a spring 223 is interposed between the arm and the bolt 222. A spring-pressed plunger 224 carries at its ends rollers one of which bears against the support 170. Upon the support 170 there is provided a cam projection 225 so positioned that when the support is in its uppermost position the plunger 224 is operated in opposition to the spring to thrust the arm of the lever 220 into its mid position, thus closing both the valves 219. The cylinder 174 and piston 175 are provided as in the previously described modification. Upon the cover 203 is secured a vessel 226 connected by a pipe 227 with the train pipe 202 by way of a spring loaded lift valve 228 having a bleed hole 229. The vessel 226 communicates with the cylinder 174 by a passage 230 leading at right angles into a chamber 231 in which slides a piston 232 loaded by a spring 233. In this modification the detent 191 is provided with an ear 234 having an inclined face and adapted to engage a lug 235 carried upon a block 236 secured to the support 170. Details of these parts are shown in Figs. 4 and 5. The action of this modification is as follows:— Upon a fall of pressure in the pipe 202 pressure commences to fall in the vessel 226, but this fall is slow owing to the action of the bleed hole 229, which action may be supplemented by the by-pass 207 controlled by the valve 208. When the pressure in the vessel 226 falls below a certain amount the piston 232 is moved by the spring 233 so as to cut off communication between the vessel 226 and the duct 230 and establish communication between the duct 230 and an exhaust hole 237 open to the atmosphere. The pressure in the cylinder 174 is thus allowed to fall rapidly, the links 196, 198 are straightened and the springs 192 draw the detent 191 into engagement with the rack 184. Simultaneously the link 195 is swung over and the bolt 222 positively moves the lever 220 so as to raise the stem of the inlet valve 219. Pressure is thus admitted from the pipe 202 to the upper side of the piston 181 by the pipes 239 and 240. Simultaneously with the lifting of the stem of the valve 219 the stem of the valve 238 is allowed to descend, thus placing the underside of the piston 181 in communication with the exhaust. The support 170 is thus forced downward and retained in its down position by the detent 191 and rack 184. When it is desired to raise the support 170 the pressure in the pipe 202 is raised, thus raising the valve 228 from its seat and raising the pressure in the vessel 226 to a sufficient degree to overcome the spring 233 and force the piston 232 to the other side of the duct 230, thus cutting off the cylinder 174 from atmosphere and allowing fluid pressure to act upon the piston 175, thus forcing it downward. This causes the detent 191 to be disengaged from the rack 184. At the same time the bolt 222 is moved so as to operate the arm of the lever 220 by means of the spring 223, thus raising the stem of the valve 238 and lowering the stem of the valve 219. This places the underside of the piston 181 in communication with fluid pressure by way of the pipes 241 and 239 and the upper side of the piston 181 in communication with exhaust; the support 170 is thus raised. When the support is nearing its extreme upward position the cam 225 operates the plunger 224 and moves the arm of the lever 220 into its normal mid position, this closing both valves 219 and 238. In rising the ear 235 carried by the block 236 when it meets the inclined face of the lug 234 carried by the detent 191 is forced to one side in opposition to the springs 192. When the support 170 reaches its uppermost position the lug 234 slips under the lug 235 and thus holds the support 170 securely in its uppermost position. To permit the detent 191 to move as thus described the slot 197 is provided in the rod 196. In this modification a spring loaded disk 190 similar to that described in the first modification may be provided for cushioning purposes.

In the modification shown in Fig. 6 the valves 219 and 238 of Fig. 3 are replaced by a simple piston valve 242 carrying a plunger 224 adapted to be operated by a cam 225 in opposition to the spring when the support 170 is at the top of its travel. The valve 242 is operated by a link 213 connected with the upper end of the swinging lever 195. The link 213 has a slot 243. In this modification the cylinder 174 is connected directly to the train pipe 202 by the pipe 201 and as in the before described modification a spring loaded valve having a bleed hole may be provided upon the cylinder cover 203. In the drawings, however, a simple bleed hole 206 is shown. The operation of this modification is as follows:—When the pressure in the pipe 202 is lowered the pressure in the cylinder 174 gradually falls until the spring 179 is able to overcome the resistance and raise the piston 175. This disengages the lug 234 from the lug 235 and allows the detent 191 to engage the rack 184. At the same time the valve 242 is operated to place the upper side of the piston 181 in communication with the pipe 202 and the lower side of the piston in communication with atmosphere. This causes the supports 170 to descend, where they are retained in the lowered position by the detent 191 and rack 184. Upon raising pressure in the pipe 202 the piston 175 is forced down, the detent 191 disengaged from the rack 184 and the valve 242 operated so as to place the under side of the piston 181 in communication with the pipe 202 and the upper side of the piston 181 in communication with atmosphere. Upon the support 170 nearing its uppermost position the cam 225 places the valve 242 in its mid position, the slot 243 permitting of this movement.

In carrying the modification of this invention into effect in which the supports are operated in conjunction with the vacuum brake system or independently by means of vacuum, the construction shown in Fig. 7 may be employed. The support operating cylinder, pipes and valve 209, are arranged in a similar manner to those shown in Fig. 6. The cylinder 174, however, in place of the cylinder cover 203, carries a cylinder 244, which in turn carries a valve chamber 245 communicating with the cylinder 244 by way of the spring loaded valve 246. A by-pass 207 controlled by a valve 208 is provided between the train pipe 202 and the cylinder 244. Between the valve chamber 210 and the train pipe 202 there is interposed a vessel 247 carrying at one end a spring loaded valve 248. The vessel 247 is connected to the valve chamber 210 by a pipe 249 and to the train pipe 202 by the pipe 250. The action of the device is as follows:—Upon a rise of pressure occurring in the train pipe 202 pressure commences to rise in the cylinder 244 by reason of the bleed hole 246, and the piston 175 which was before held up by vacuum descends under the action of the spring 251, thus allowing the detent 191 to engage the rack 184. Simultaneously the valve 209 is operated to place the pipe 249 in communication with the underside of the piston 181 by way of the pipe 193 and at the same time puts the upper side of the piston 181 in communication with atmosphere by way of the pipe 240 and the orifice 252. Although the pressure has been allowed to rise in the pipe 202 a considerable degree of vacuum will remain in the vessel 247 as the vacuum in this vessel is unimpaired. The support 170 is thus caused to descend by atmospheric pressure acting upon the upper side of the piston 181 and is held in its lowered position by the detent 191 engaging the rack 184. Upon a reduction of pressure occurring in the train pipe 202 the valve 246 will be raised off its seat and the cylinder 244 rapidly evacuated, thus raising the piston 175, at the same time disengaging the detent 191 and moving the valve 209 into such a position as to place the upper side of the piston 181 in communication with the vessel 247 and the lower side of the piston in communication with atmosphere. The reduction in pressure in the pipe 202 raises the valve 248 from its seat, and thus allows free passage of fluid from the upper side of the piston 181 and permits a rapid rise of the support 170.

Although the operations of the foregoing supporting devices have been described for one support only it is to be understood that supports are employed in pairs, the operation of the other member of the pair being exactly similar and synchronous with the operation of the support described.

It has been assumed in the foregoing description that the pipe 202 was common to the brake system and the support actuating gear. It is to be understood, however, that the pipe 202 may be independently controlled by the driver of the vehicle and may be altogether distinct from the brake train pipe. Further, it will be understood that any suitable form of valve may be employed to control the admission and exhaust of fluid to the support operating cylinders 180.

Owing to the universal joint 173 connecting the foot 172 to the support 170 it is possible to obtain satisfactory lateral support for the vehicle on considerably rough ground.

Although the foregoing supports and their accompanying gear have been described in conjunction with a monorail vehicle it is obvious that they may be applied to any single track vehicle. Also one or more pairs of such supports may be employed, for instance, two at the front and two at the rear of the vehicle, or if the vehicle be of very great length it may be desirable to provide one or more further pairs of supports in the length of the vehicle.

Having now described my invention, what I claim as new and desire to secure by Letters Patent is:—

1. Lateral supporting means for single track vehicles comprising a member sliding in guides and provided with a universally jointed foot and a rack together with a pawl or detent and means to engage and disengage said detent with said rack.

2. Lateral supporting means for single track vehicles comprising a member sliding in guides and provided with a universally jointed foot and a rack together with a pawl or detent and means to engage and disengage said detent with said rack and a projection upon the pawl or detent adapted to engage a projection upon the lateral support whereby the support is retained in its raised position.

3. Lateral supporting means for single track vehicles comprising in combination a member sliding in guides, a rack upon said member, a pawl or detent, means to engage and disengage said detent with said rack, a cylinder upon the vehicle, a piston or plunger on said sliding member adapted to work in said cylinder, valves controlling said cylinder, means including a cylinder and piston adapted to control said valves, duct means connecting said valve controlling cylinder to the fluid brake pipe of the vehicle, substantially as described.

4. Lateral supporting means for single track vehicles comprising in combination a member sliding in guides; a rack on said member, a pawl or detent carried by the vehicle, means to engage and disengage said detent with said rack comprising a cylinder upon the vehicle, plunger means in said cylinder, a cross-head carried by said plunger, a toggle between said cross-head and said detent, said toggle including a swinging link upon the vehicle body, a link connecting the free end of said swinging link and said cross-head, a second link connecting at one end to the free end of said swinging link and by a slot to said detent.

5. In single track vehicles a lateral support and means adapted to delay the lowering of the support until the vehicle has come to rest comprising a vessel with a spring loaded valve having a leak hole in it said vessel being so arranged that the drop or rise of pressure in the support actuating or the toggle operating cylinders or both is delayed.

In testimony whereof I affix my signature in presence of two witnesses.

LOUIS BRENNAN.

Witnesses:
M. ATKINSON ADAMS,
ALBERT E. TASKER.

Copies of this patent may be obtained for five cents each, by addressing the "Commissioner of Patents, Washington, D. C."